(12) United States Patent
Jaworek et al.

(10) Patent No.: US 7,888,424 B2
(45) Date of Patent: Feb. 15, 2011

(54) METHOD FOR PRODUCING A CURABLE AQUEOUS POLYMER DISPERSION

(75) Inventors: Thomas Jaworek, Kallstadt (DE); Horst Binder, Lampertheim (DE); Wolfgang Paulus, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1582 days.

(21) Appl. No.: 10/433,480

(22) PCT Filed: Dec. 11, 2001

(86) PCT No.: PCT/EP01/14547

§ 371 (c)(1),
(2), (4) Date: Jun. 12, 2003

(87) PCT Pub. No.: WO02/48210

PCT Pub. Date: Jun. 20, 2002

(65) Prior Publication Data

US 2004/0018367 A1 Jan. 29, 2004

(30) Foreign Application Priority Data

Dec. 12, 2000 (DE) .............................. 100 61 726

(51) Int. Cl.
C08F 8/00 (2006.01)
B05D 3/06 (2006.01)
(52) U.S. Cl. .................... 524/560; 524/832; 525/330.1; 427/508
(58) Field of Classification Search ............. 427/407.1, 427/508, 553; 524/560, 832; 525/330.1
See application file for complete search history.

(56) References Cited

U.S. PATENT DOCUMENTS

| | | | |
|---|---|---|---|
| 3,919,126 A | | 11/1975 | Rakshys |
| 5,089,342 A | * | 2/1992 | Dhein et al. ................. 428/413 |
| 5,484,850 A | * | 1/1996 | Kempter et al. ............. 525/286 |
| 5,939,195 A | * | 8/1999 | Allen et al. .................. 428/413 |

FOREIGN PATENT DOCUMENTS

| | | |
|---|---|---|
| DE | 37 11 791 | 10/1987 |
| DE | 40 21 514 | 1/1991 |
| DE | 44 26 323 | 2/1996 |
| DE | 195 08 530 | 9/1996 |
| DE | 196 26 839 | 1/1998 |
| DE | 196 53 631 | 6/1998 |
| EP | 0 316 732 | 5/1989 |
| EP | 0 355 892 | 2/1990 |
| EP | 0 370 299 | 5/1990 |
| EP | 0 554 783 | 8/1993 |
| EP | 0 650 978 | 5/1995 |
| EP | 0 650 979 | 5/1995 |
| EP | 0 699 724 | 3/1996 |
| FR | 2 757 866 | 7/1998 |
| GB | 2 219 591 | 12/1989 |

* cited by examiner

Primary Examiner—William Phillip Fletcher, III
(74) Attorney, Agent, or Firm—Oblon, Spivak, McClelland, Maier & Neustadt, L.L.P.

(57) ABSTRACT

A curable aqueous polymer dispersion is prepared by:
I) reacting a (meth)acrylate polymer A) that carries ethylenically unsaturated groups and functional groups capable of a condensation or addition reaction, with at least one compound B) which
Ia) carries at least one functional group that is complementary to the functional groups of the copolymer A) that are capable of undergoing a condensation or addition reaction, and additionally at least one ionogenic, ionic group or a combination thereof, or which
Ib) carries at least one functional groups that is complementary to the functional groups of the copolymer A) that are capable of condensation or addition reaction and is capable of forming an ionogenic or ionic group in a condensation or addition reaction,
to give a copolymer AI) which carriers ethylenically unsaturated groups and ionogenic groups, ionic groups or a combination thereof,
II) with the proviso that when the ionogenic groups are present in compound B), converting at least some of the ionogenic groups of the copolymer AI) into ionic groups, and
III) dispersing the copolymer AI) in an aqueous dispersion medium.

15 Claims, No Drawings

METHOD FOR PRODUCING A CURABLE AQUEOUS POLYMER DISPERSION

BACKGROUND OF THE INVENTION

1. Field of the Invention

The present invention relates to a process for preparing a curable aqueous polymer dispersion, to the polymer dispersion obtainable by this process, to a coating composition comprising at least one such polymer dispersion, and to a process for producing a coated substrate using such a polymer dispersion.

2. Description of the Background

Radiation-curable coating materials, based for example on polyester and polyether acrylates and methacrylates, have acquired great industrial significance and found broad application. Owing to their crosslinkability, they are suitable in particular for preparing radiation-curable coating compositions, e.g., paint formulations, which can be cured rapidly by actinic radiation. They are employed to coat both nonabsorbent substrates, such as metals, plastics, and glass, and absorbent substrates, such as wood, paper, and leather.

In order to prevent environmental pollution through solvent emissions and to satisfy corresponding legal provisions, there is increasing use of radiation-curable paint formulations based on polymer dispersions in which the water content of the dispersion medium is as high as possible. Additional requirements are imposed on coating compositions for outdoor applications. For example, they are intended to have good stability in the case of weathering effects, and in particular with respect to UV radiation. At present, urethane acrylate dispersions are used substantially for outdoor applications. A disadvantage of these dispersions is their high production cost, putting them at an economic disadvantage.

In the preparation of coating compositions it is known to use polymers based on vinyl monomers which have a relatively narrow molecular weight distribution (polydispersities $M_w/M_n<5.0$) and relatively low molecular weights ($M_n$ between 1000 and 10 000).

EP-A-0 554 783 describes a process for continuous polymerization of vinyl monomers which forms vinyl polymers having a number-average molecular weight $M_n$ in the range from 1000 to 20 000 and a polydispersity $M_w/M_n<3.5$, the polymerization being conducted in an annular gap reactor. These vinyl polymers contain no incorporated ethylenically unsaturated double bonds and can therefore not be crosslinked free-radically by what is known as self-crosslinking. In general they are also unsuitable for the preparation of polymer dispersions based on dispersion media that contain water.

EP-A-0 650 978 describes free-radically crosslinkable copolymers having a number-average molecular weight in the range from 1500 to 6000 and a polydispersity of from 1 to 4.0 which are obtainable by polymer-analogously reacting a vinyl polymer with a compound by means of which ethylenically unsaturated double bonds are introduced into the polymer. EP-A-0 650 979 describes a process for preparing such free-radically crosslinkable copolymers where the polymer-analogous reaction takes place in an extruder. Because of their molecular weight, these copolymers are highly viscous or solid. They are therefore suitable, preferably, for use as binders for powder coating. There is in fact a general description of formulations of these copolymers in the form of solutions and dispersions. For use in stable, water-containing dispersions, however, these copolymers are still in need of improvement.

SUMMARY OF THE INVENTION

It is an object of the present invention to provide a process for preparing free-radically crosslinkable (curable) polymer dispersions. The dispersions obtained by this process are also to be stable with aqueous dispersion media. Preferably, there should be no need to use expensive urethane acrylates. In particular, these dispersions are to be suitable as coating compositions or as a coating component in the coating of a large number of different substrates. In the case of outdoor use, they are preferably to feature good stability to the effects of weathering, especially with respect to UV radiation.

We have found that this object is achieved by a process for preparing a curable polymer dispersion by modifying a (meth)acrylate copolymer containing ethylenically unsaturated double bonds additionally with ionogenic and/or ionic groups in a polymer-analogous reaction and then dispersing the polymer, where appropriate following neutralization and/or quaternization.

The present invention provides a process for preparing a curable aqueous polymer dispersion by I) polymer-analogously reacting a (meth)acrylate copolymer A) having a number-average molecular weight $M_n$ in the range from 1400 to 10 000 and a polydispersity of from 1 to 5.0, said copolymer A) carrying ethylenically unsaturated groups and functional groups capable of a condensation or addition reaction, with at least one compound B) which
   - Ia) carries at least one functional group that is complementary to the functional groups of the copolymer A) that are capable of condensation or addition reaction, and additionally at least one ionogenic and/or ionic group, or which
   - Ib) carries at least one functional group that is complementary to the functional groups of the copolymer A) that are capable of condensation or addition reaction and is capable of forming an ionogenic or ionic group in a condensation or addition reaction,
   to give a copolymer AI) which carries ethylenically unsaturated groups and ionogenic and/or ionic groups,
II) where present, converting at least some of the ionogenic groups of the copolymer AI) into ionic groups, and
III) dispersing the copolymer AI) in a dispersion medium.

DETAILED DESCRIPTION OF THE PREFERRED EMBODIMENTS

For the purposes of this invention, the prefix "(meth) acryl-" denotes compounds which may be derived equally from acrylic acid and methacrylic acid.

Step I)

For the purposes of the present invention, a (meth)acrylate copolymer (component A) is a polymer containing in copolymerized form at least one ethylenically unsaturated monomer that has a structural element of the formula $$CH_2=C(R)-C(=O)-$$

where R=H or $CH_3$.

The (meth)acrylate copolymers A) used in accordance with the invention preferably have a polymer backbone composed of copolymerized vinyl monomers to which there are attached ethylenically unsaturated double bonds, capable of curing, and further, different, functional groups which are capable of a condensation or addition reaction.

The polymer backbone of the copolymers A) preferably contains no urethane or urea groups.

In step I) it is preferred to use a copolymer A) having a number-average molecular weight in the range from about 1500 to 6000.

The polydispersity $M_w/M_n$, i.e., the ratio of the weight-average to the number-average molecular weight of the copolymers A), is preferably not more than 4.5, in particular not more than 3.5, and ideally has a value of not more than 3. In the present case, the polydispersities and also the weight-average and number-average molecular weights relate to measurements made by gel permeation chromatography using polystyrene as standard. Such a method is described in Analytiker-Taschenbuch, volume 4, pages 433-442, Berlin 1984.

For the purposes of the present invention, a polymer-analogous reaction is a reaction involving functional groups of the macromolecule (e.g., of component A or, subsequently, of component Ai). Said functional groups comprise groups other than ethylenically unsaturated groups. The functional groups in question are preferably inert under the conditions of the free-radical polymerization. The copolymers A) used in accordance with the invention in step I) contain functional (reactive) groups which are able to react, in a condensation or addition reaction, with the functional groups of the compounds B), with the formation of a chemical bond. For this purpose the copolymers A) are reacted with compounds B) whose functional groups are complementary to those of the copolymer. For the purposes of the present invention, complementary functional groups are a pair of functional groups which are able to react with one another in a condensation or addition reaction.

Complementary compounds are pairs of compounds having functional groups complementary to one another.

Functional groups suitable for forming complementary pairs are preferably selected from hydroxyl, primary and secondary amino, thiol, carboxylic acid, carboxylic ester, carboxamide, carboxylic anhydride, sulfonic acid, sulfonic ester, isocyanate, urethane, urea, ether, and epoxy groups.

Pairs that are suitable for reaction are, for example, on the one hand, compounds containing active hydrogen atoms, selected for example from compounds containing alcohol groups, primary and secondary amine groups, and thiol groups, and, on the other hand, compounds containing groups reactive therewith, selected for example from carboxylic acid, carboxylic ester, carboxamide, carboxylic anhydride, isocyanate, urethane, urea, alcohol, ether, and epoxy groups. A further suitable pair comprises, for example, compounds containing epoxy groups, on the one hand, and compounds containing carboxylic acid groups, on the other. It is not generally critical what functional group of the pair the polymer A) carries and what group of the pair the compound B) carries. Particular significance attaches to the carboxylic anhydride group, since in an addition reaction it is capable at the same time of forming an ionogenic or ionic group. In process variant Ib) of the invention, therefore, it is preferred to use carboxylic anhydrides as compound B).

In one appropriate embodiment of the process of the invention, the copolymer A) contains in copolymerized form, as its monomer containing a functional group capable of condensation or addition reaction, at least one compound selected from the following: esters and amides of α,β-ethylenically unsaturated monocarboxylic and dicarboxylic acids, (meth) acrolein, (meth)acrylamide, ethylenically unsaturated compounds with an isocyanate function, α,β-ethylenically unsaturated monocarboxylic and dicarboxylic acids and their monoesters and anhydrides, and the glycidyl esters of α,β-ethylenically unsaturated monocarboxylic and dicarboxylic acids. The disclosure below of the corresponding monomers a1) and a2) is incorporated here by reference. Particular preference is given to glycidyl acrylate and glycidyl methacrylate.

In one appropriate embodiment of the process of the invention, the polymer-analogous reaction is carried out using a compound B) which carries at least one functional group that is complementary to the corresponding functional groups of the copolymer A) and additionally at least one ionogenic and/or ionic group (variant Ia). The ionogenic and/or ionic groups are preferably carboxylic acid groups and/or sulfonic acid groups and/or nitrogen groups (amines) or carboxylate groups and/or sulfonate groups and/or quaternized or protonated groups. As component B) it is preferred to use hydroxycarboxylic acids, such as hydroxyacetic acid (glycolic acid), hydroxypropionic acid (lactic acid), hydroxysuccinic acid (malic acid), etc.

In a further suitable embodiment of reaction variant Ia), the compound used as B) is at least one diamine containing a primary or secondary amino group and a tertiary amino group. Examples thereof include N,N-dimethylethylenediamine, N,N-diethylethylenediamine, N,N-dimethylpropylenediamine, 1-methylpiperazine, etc.

In another suitable embodiment of reaction variant Ia), the compound used as B) is at least one amino alcohol containing a tertiary amino group.

In another appropriate embodiment, component B) comprises an amine of the formula

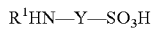

where

Y is o-, m- or p-phenylene or straight-chain or branched $C_2$-$C_6$ alkylene, unsubstituted or substituted by 1, 2 or 3 hydroxyl groups, and $R^1$ is a hydrogen atom, a $C_1$-$C_{12}$ alkyl group (preferably $C_1$-$C_{10}$ and especially $C_1$-$C_6$ alkyl group) or a $C_5$-$C_6$ cycloalkyl group), the alkyl group or the cycloalkyl group being unsubstituted or substituted by 1, 2 or 3 hydroxyl, carboxyl or sulfonic acid groups.

Preferably, the amine of the above formula is taurine, N-(1,1-dimethyl-2-hydroxyethyl)-3-amino-2-hydroxypropanesulfonic acid or 2-aminoethylaminoethanesulfonic acid.

In another appropriate embodiment, the compound B) comprises a customary α-, β- or γ-amino acid, examples being glycine, alanine, valine, leucine, isoleucine, phenylalanine, tyrosine, proline, hydroxyproline, serine, threonine, methionine, cysteine, tryptophan, β-alanine, aspartic acid, and glutamic acid.

In another appropriate embodiment of the process of the invention, the polymer-analogous reaction is carried out using at least one compound B) which carries at least one functional group which is complementary to corresponding functional groups of the copolymer A) and is capable of forming an ionogenic or ionic group in a condensation or addition reaction (variant Ib).

In process variant Ib), the compound B) is preferably selected from carboxylic anhydrides. These include, quite generally, aliphatic, cycloaliphatic, and aromatic carboxylic anhydrides.

The compound B) is preferably selected from aliphatic carboxylic anhydrides, with particular preference from glutaric anhydride, succinic anhydride, and mixtures thereof. As compound B), use is made in particular of succinic anhydride.

The polymer-analogous reaction between the copolymer A) and the compound B) takes place under the conditions which are customary for condensation and/or addition reactions and which are known to the skilled worker.

In the case of condensation reactions, such as that of esterification, for example, it is usual to remove the product of condensation from the reaction mixture. Suitable modes of reaction and apparatus, such as the use of azeotrope-forming entrainers, water separators, etc., are known to the skilled worker.

In the reaction of isocyanate groups with groups that are reactive toward isocyanate groups, it is generally advantageous to operate in the melt or in the presence of an anhydrous solvent. To accelerate this addition reaction, known catalysts may be used.

Suitable catalysts are generally all those normally used to accelerate the reaction between the complementary groups. For the epoxy/carboxylic acid reaction pair, for example, phosphines such as triphenylphosphine and also amines such as dimethylbenzylamine, dimethylethanolamine and tributylamine and also tetraalkylammonium halides are suitable, and for the isocyanate/alcohol reaction pair organotin compounds, for example, are suitable, such as dibutyltin dilaurate, tin(II) octoate, etc.

The ratio of functional groups of the (meth)acrylate copolymer A) to the functional groups of the compound B) is preferably from 0.7:1 to 1.3:1, more preferably from 0.8:1 to 1.2:1, and with very particular preference approximately 1:1.

Any compounds B) used in excess or unreacted may be removed by customary techniques known to the skilled worker, such as by devolatilization, for example.

Where appropriate, at least one inhibitor may be added to the copolymers A) prior to the polymer-analogous reaction in order to prevent thermal crosslinking. Inhibitors are usually used in amounts of from 1 to 5000 ppm, preferably from 1 to 1000 ppm.

Examples of suitable inhibitors include phenothiazines, sterically hindered o-phenols, and monoethers of hydroquinone.

Where a solvent is used for the polymer-analogous reaction, it is preferably a water-miscible solvent which is inert under the reaction conditions, e.g., a ketone, such as acetone or methyl ethyl ketone, tetrahydrofuran, N-methylpyrrolidone, etc. Where a substantially water immiscible solvent is used for the reaction, it is preferably removed prior to the dispersion or replaced by a water-miscible solvent.

In the polymer-analogous reaction of the copolymer A) with the compound B), the reaction temperature is situated preferably within a range from 50 to 150° C., with particular preference from 60 to 140° C.

The (meth)acrylate copolymers A) used in step I) in accordance with the invention are prepared by free-radical polymerization of a monomer mixture under polymerization conditions resulting in copolymers having the desired number-average molecular weight and the desired polydispersity, followed where appropriate by a reaction to introduce ethylenically unsaturated groups into the copolymer.

Copolymers A) having low polydispersity and low molecular weight are preferably formed at reaction temperatures within a range from about 140 to 210° C., with particular preference from 150 to 180° C., and in particular from 150 to 170° C. The reaction times are preferably situated within a range from about 2 to 90 min, with particular preference from 5 to 50 min, and in particular from 5 to 25 min, such as from 10 to 15 min, for example.

When monomers and/or solvents are used whose boiling points are below the reaction temperature, the reaction appropriately takes place under superatmospheric pressure, preferably under the autogenous pressure of the system under the respective reaction conditions. In general, pressures higher than 30 bar are unnecessary.

Suitable reactors for maintaining the aforementioned reaction conditions are known to the skilled worker. They include, for example, stirred reactors in which rapid mixing of the starting products with heat dissipation is ensured. The polymerization to prepare the methacrylate copolymers A) used in accordance with the invention takes place preferably in an annular gap reactor, especially in a thin-film annular gap reactor with recycling facility, or a Taylor reactor. Advantageously, in such a reactor, the exothermic polymerization can be carried out under substantially isothermal conditions owing to the favorable ratio between heat exchange area and reaction volume.

Copolymerizations in annular gap reactors are common knowledge and may be performed, for example, in a tube reactor equipped with a rotor. They are preferably equipped with a means of recycling part of the product to the reactor entry. It is, however, also possible to use other polymerization apparatus, such as stirred tanks, for example, provided that adequate heat dissipation is ensured. Suitable copolymerizations in thin-film annular gap reactors are described, for example, in EP-A-0 554 783, which is hereby incorporated by reference.

The (meth)acrylate copolymers A) used in step I) in accordance with the invention may be prepared, for example, without solvent or in solution. Solventless preparation is preferred. Suitable solvents are generally liquids which are inert toward the co-reactants under the reaction conditions, examples being ethers such as ethylene glycol ethers and ethylene diglycol ethers, esters such as butyl acetate, ketones such as methyl amyl ketone, alkylaromatics, such as toluene, the isomeric xylenes, and cumene, and aliphatic alcohols, such as isopropanol, etc. Advantageously, the alkylaromatics, and especially cumene and m-xylene, are used as solvents. It is advantageous to use water-miscible solvents which are suitable as a component of the dispersion medium for dispersing the copolymer AI) in step III). In one preferred embodiment, the conversion in the polymerization reaction for preparing the copolymers A) is restricted to from about 50 to 95 mol %, preferably from 80 to 95 mol %, in order to narrow the molecular weight distribution as much as possible. Following the polymerization, unreacted monomers, volatile oligomers, and the solvent, where used, may be separated from the reaction mixture by separation techniques that are common knowledge to the skilled worker and may appropriately be recycled to the polymerization.

Suitable initiators for the free-radical polymerization include compounds that form free radicals, such as peroxo compounds or azo compounds, for example. Their decomposition temperature is preferably situated within a range from 140 to 200° C. Examples of suitable polymerization initiators are tert-butyl peroxyisobutyrate, methyl isobutyl ketone peroxide, dicumyl peroxide, tert-butyl cumyl peroxide, di-tert-butyl peroxide, cumyl hydroperoxide, tert-butyl per-2-ethylhexanoate, di-tert-amyl peroxide, 2,5-dimethyl-2,5-di(tert-butylperoxy)hexane, dibenzoyl peroxide, aliphatic and cycloaliphatic azo compounds, e.g., 2,2'-azobis-(isobutyronitrile), etc. The amount of initiator used, based on the monomers, is generally within a range from about 0.3 to 10% by weight, preferably from 0.5 to 2% by weight.

In accordance with the invention, the (meth)acrylate copolymer A) used in step I) contains in copolymerized form at least one monomer a1) having a radical of the formula

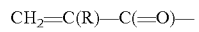

where R=H or CH$_3$. The copolymers A) further preferably contain in copolymerized form at least one free-radically polymerizable monomer a2) which is different than a1). For introducing ethylenically unsaturated (curable) double bonds into the copolymer A), at least one of the monomers, a1) and/or a2), carries a functional group capable of a condensation or addition reaction. By way of such functional groups, which are not used to introduce ethylenically unsaturated (curable) double bonds into the copolymer A), it is possible subsequently to introduce the ionogenic or ionic groups into the copolymer A). Preferably, therefore, the (meth)acrylate copolymer A) is prepared by free-radical polymerization of a monomer mixture comprising monomers which carry a functional group capable of a condensation or addition reaction, to give a copolymer Ai), and subsequent polymer-analogous reaction of the copolymer Ai) with at least one ethylenically unsaturated compound C) which additionally carries at least one functional group complementary to the functional groups of the monomers a1) and/or a2) that are capable of condensation or addition reaction.

The copolymer Ai) preferably contains in copolymerized form from 20 to 85 mol % of at least one monomer a1) and from 15 to 80 mol % of at least one free-radically polymerizable monomer a2) which is other than a1), and from 5 to 50 mol % of the monomers a1) and/or a2), based on the overall amount of the monomers a1) and a2), carry a functional group capable of a condensation or addition reaction.

Suitable monomers a1) without functional groups capable of a condensation or addition reaction are, for example, the esters of acrylic acid and methacrylic acid with $C_1$-$C_{30}$ alcohols and also the amides of acrylic acid and methacrylic acid with $C_1$-$C_{30}$ mono- and dialkylamines. These include, for example, the $C_1$-$C_{12}$ alkyl esters of (meth)acrylic acid, such as methyl acrylate, ethyl acrylate, n-propyl acrylate, isopropyl acrylate, n-butyl acrylate, isobutyl acrylate, tert-butyl acrylate, n-hexyl acrylate, 2-ethylhexyl acrylate, methyl methacrylate, ethyl methacrylate, n-propyl methacrylate, isopropyl methacrylate, n-butyl methacrylate, tert-butyl methacrylate, n-hexyl methacrylate, 2-ethylhexyl methacrylate, etc. Methyl acrylate and methyl methacrylate are preferred. Further suitable monomers a1) include alkoxyalkyl (meth)acrylates, such as methoxyethyl (meth)acrylate, cycloalkyl (meth)acrylates, such as cyclohexyl (meth)acrylate, aryl (meth)acrylates, and arylalkyl (meth)acrylates, such as benzyl (meth)acrylate.

Preferred monomers a2) without a functional group capable of a condensation or addition reaction are the esters of α,β-ethylenically unsaturated monocarboxylic and/or dicarboxylic acids, other than (meth)acrylic acid, with $C_1$-$C_{30}$ alcohols. Particular preference is given to the $C_1$-$C_{12}$ alkyl esters of crotonic acid, fumaric acid, itaconic acid, and maleic acid.

Further suitable monomers a2) include vinylaromatics, preferably styrene, 1-methylstyrene, 4-tert-butylstyrene, and 2-chlorostyrene.

Further suitable monomers a2) include the esters of vinyl alcohol or allyl alcohol with $C_1$-$C_{30}$ monocarboxylic acids, preferably the vinyl esters of $C_2$-$C_{20}$ fatty acids, such as vinyl acetate, vinyl propionate, vinyl n-butyrate, vinyl stearate, vinyl laurate, etc. Also suitable are vinyl halides and vinylidene halides, such as vinyl chloride and vinylidene chloride. Further suitable compounds include $C_2$-$C_8$ monoolefins, such as ethene, conjugated dienes such as butadiene and isoprene, and vinyl ethers of $C_1$ to $C_{20}$ alkanols, such as methyl, ethyl, n-butyl, isobutyl, tert-butyl, and dodecyl vinyl ether, etc.

Further suitable monomers a2) include heterocyclic vinyl compounds, such as 2-vinylpyridine and N-vinylpyrrolidone.

Suitable monomers a1) which carry a functional group capable of condensation or addition reaction contain not only a radical of the formula

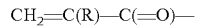

where R=H or CH$_3$ but also at least one functional group which is preferably selected from the same functional groups which, as described above, are used to modify the copolymer A) with ionogenic or ionic groups by means of polymer-analogous reaction with a compound B). Preferred functional groups of these monomers a1) are the hydroxyl group, the amino group, the carboxylic acid group, the carboxylic ester group, the carboxamide group, the isocyanate group, the carbonyl group in aldehyde or ketone function, and the epoxy group. The carboxyl group and the epoxy group are particularly preferred.

Preferred monomers a1) which carry a functional group capable of condensation or addition reaction are selected from the esters of acrylic acid and methacrylic acid with $C_2$-$C_{30}$ alkanediols, especially 2-hydroxyethyl acrylate and 2-hydroxyethyl ethacrylate, the amides of methacrylic acid with $C_2$-$C_{30}$ amino alcohols, especially 2-aminoethyl acrylate and 2-aminoethyl methacrylate, (meth)acrolein, (meth)acrylamide, (meth)acrylic acid, glycidyl (meth)acrylate, and mixtures thereof.

Preferred monomers a2) which carry a functional group capable of condensation or addition reaction are selected from the esters of α,β-ethylenically unsaturated monocarboxylic and dicarboxylic acids, other than acrylic acid and methacrylic acid, with $C_2$-$C_{30}$ alkanediols, from the amides of α,β-ethylenically unsaturated monocarboxylic and dicarboxylic acids, other than acrylic acid and methacrylic acid, with $C_2$-$C_{30}$ amino alcohols, and also allyl alcohol, vinyl ethyl ketone, vinyl isocyanate, dimethyl 3-isopropenylbenzylisocyanate (TMI), and 4-isocyanatostyrene, non(meth)acrylic α,β-ethylenically unsaturated monocarboxylic and/or dicarboxylic acids and their monoesters and anhydrides, such as fumaric acid, maleic acid, itaconic acid, crotonic acid, maleic anhydride, and monobutyl maleate, and mixtures thereof.

The copolymers Ai) preferably contain from 20 to 85 mol %, with particular preference from 40 to 85 mol %, and in particular from 60 to 80 mol %, of at least one monomer a1) and from 15 to 80 mol %, preferably from 15 to 60 mol %, and in particular from 20 to 40 mol %, of at least one monomer a2), in incorporated form. The fraction of the monomers a1) and/or a2) that carry a functional group capable of condensation or addition reaction is preferably from 5 to 50 mol %, with particular preference from 15 to 40 mol %, and in particular from 20 to 35 mol %.

If desired, the copolymers Ai) following their preparation may be freed from solvents and/or excess monomers by customary techniques known to the skilled worker. These include, for example, distillation under reduced pressure or the passage of nitrogen through a melt of the copolymers. Particularly suitable is a continuously operated thin-film evaporator, connected in series, in which the copolymer is devolatilized. The devolatilizing temperature is preferably in a range of 160-220° C.

For preparing the (meth)acrylate copolymers A), the copolymers Ai) may be derivatized in a polymer-analogous reaction with at least one ethylenically unsaturated compound C). As already described above for the polymer-analogous reaction of the copolymer A) with the compound B), the copolymers Ai) are reacted with functional vinyl compounds C) whose functional groups are complementary to those of the polymer Ai). The reaction between the copolymer Ai) and the compound C) takes place essentially between the complementary functional groups and not between the ethylenically unsaturated double bonds of the components. Suitable compounds C) include in principle the aforementioned monomers a1) and a2) containing functional groups that are capable of a condensation or addition reaction. From the group of the vinyl compounds C) and the monomers a1) and/or a2) it is then possible, again as already described above, to select a complementary pair whose functional groups react with one another in a condensation or addition reaction. In this case, one reactant is used as monomer a1) or a2) in the preparation of the copolymer Ai) while the other serves as a reactant in the polymer-analogous reaction. Preferred complementary pairs are methacryloyl isocyanate/hydroxyalkyl methacrylate, hydroxyalkyl methacrylate/methacrylic anhydride, and hydroxyalkyl methacrylate/methacryloyl chloride. Particular preference is given to complementary pairs of glycidyl acrylate or glycidyl methacrylate with acrylic acid or methacrylic acid.

A further possibility for preparing the (meth)acrylate copolymers A) consists in partly hydrolyzing any ester groups present in the copolymer Ai) and then reacting the resulting carboxyl groups with glycidyl methacrylates or glycidyl acrylates.

Appropriate catalysts for the condensation or addition reaction are those mentioned above in the context of the polymer-analogous reaction of the copolymers A) with the compound B).

The ratio of functional groups of the copolymer Ai) to the functional vinyl monomers C) is preferably situated within a range from about 0.7:1 to 1.3:1, with particular preference from 0.8:1 to 1.2:1, and in particular about 1:1.

If desired, the polymer-analogous reaction may be carried out using the abovementioned inhibitors in the amounts that were likewise mentioned above.

With particular preference, the polymer-analogous reaction takes place in an extruder, such as in a self-cleaning multiscrew extruder, for example.

(Meth)acrylate copolymers A) which can be used in accordance with the invention, and processes for preparing them, are described in EP-A-0650978 and EP-A-0650979, the entire content of which is incorporated here by reference.

Step II)

Where the copolymers AI) obtained in step I) contain acid groups as anionogenic groups, some or all of these groups may be neutralized by reaction with a base. Bases used to neutralize the polymers may be alkali metal bases, such as sodium hydroxide, potassium hydroxide, sodium carbonate, sodium bicarbonate, potassium carbonate or potassium bicarbonate, and alkaline earth metal bases, such as calcium hydroxide, calcium oxide, magnesium hydroxide or magnesium carbonate, and also ammonia and amines. Where the copolymers AI) obtained in step I) contain amine groups as cationogenic groups, these groups may be converted into cationic groups either by protonation, with carboxylic acids, such as lactic acid, or mineral acids, such as phosphoric acid, sulfuric acid, and hydrochloric acid, for example, or by quaternization, using alkylating agents, such as $C_1$-$C_4$ alkyl halides or sulfates, for example. Examples of alkylating agents are ethyl chloride, ethyl bromide, methyl chloride, methyl bromide, dimethyl sulfate, and diethyl sulfate. The conversion of ionogenic into ionic groups may be partial or complete: that is, to 100 mol %.

Step III)

As dispersion media it is preferred to use water or mixtures of water and at least one water-miscible solvent. Where a water-immiscible organic solvent is used in the preparation of the copolymers AI), it may be removed following the preparation by customary techniques known to the skilled worker, such as by distillation under reduced pressure, for example. Additionally, prior to the separation of the solvent, water and/or a water-miscible solvent may be added to the copolymer. The dispersion media of the invention preferably have a water content of at least 50% by weight, with particular preference at least 70% by weight, and in particular at least 90% by weight, based on the overall amount of dispersion medium. Particular preference is given to using straight aqueous dispersions. Where the dispersion media include at least one water-miscible solvent, it is preferably selected from alkanols, such as methanol, ethanol, propanol, isopropanol, n-butanol, and tert-butanol, ketones, such as acetone and methyl ethyl ketone, cyclic ethers, such as tetrahydrofuran, and mixtures thereof.

The invention additionally provides a polymer dispersion obtainable by the process described above. The polymer dispersions of the invention are advantageously suitable as coating compositions or as a component of coating compositions.

The invention further provides a coating composition comprising:
- at least one polymer dispersion of the invention,
- if desired, at least one further oligomer or polymer containing at least one ethylenically unsaturated double bond,
- if desired, at least one additive.

As a compound containing at least one ethylenically unsaturated double bond, the coating composition of the invention may include one or more of what are known as reactive diluents. Reactive diluents are liquid compounds of low molecular mass which have at least one, polymerizable, ethylenically unsaturated double bond. An overview of reactive diluents is given, for example, in J. P. Fouassier (ed.), Radiation Curing in Polymer Science and Technology, Elsevier Science Publisher Ltd., 1993, Vol. 1, pp. 237-240. Preferred reactive diluents are those based on esters of acrylic acid and/or of methacrylic acid with aliphatic diols or polyols in which at least two of the OH groups of the diols or polyols have been esterified with acrylic and/or methacrylic acid. Suitable aliphatic diols and polyols generally have from 2 to 20 carbon atoms and may have a linear, branched or cyclic carbon framework. They preferably contain no functional groups. Apart from one or two ether oxygens, they preferably contain no heteroatoms. Examples of such reactive diluents are butanediol diacrylate, hexanediol diacrylate, octanediol diacrylate, decanediol diacrylate, cyclohexanediol diacrylate, trimethylolpropane triacrylate, pentaerythritol tetraacrylate, dipentaerythritol penta/hexaacrylate, dipropylene glycol diacrylate, and also the corresponding esters of methacrylic acid, and the products LR 8887, PO 33F, LR 8967, and LR 8982 sold under the Laromer® brand names of BASF AG.

Additionally, the coating composition of the invention may comprise further reactive diluents other than those mentioned above. Reactive diluents of this kind are likewise mono-, di- or polyunsaturated compounds. They normally are used to influence the viscosity and technical properties of the coating, such as the crosslinking density. Examples of such compounds are (meth)acrylic acid and their $C_1$-$C_{10}$ alkyl esters, maleic acid and its $C_1$-$C_{10}$ alkyl esters and monoesters, vinyl acetate, vinyl ethers, divinylureas, polyethylene glycol di(meth)acrylate, vinyl (meth)acrylate, allyl (meth)acrylate, styrene, vinyltoluene, divinylbenzene, tris(acryloyloxymethyl) isocyanurate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethylacrylamide, and dicyclopentyl acrylate, and also the long-chain linear diacrylates described in EP 0 250 631 A1, having a molecular weight of from 400 to 4.000, preferably from 600 to 2.500, daltons. Also suitable for use, moreover, is the reaction product of 2 moles of acrylic acid with one mole of a dimer fatty alcohol containing generally 36 carbon atoms. Mixtures of the monomers mentioned are also suitable.

As an additive, the coating compositions of the invention may include in general from 0.1 to 5% by weight, preferably from 0.1 to 2% by weight, in particular from 0.2 to 1% by weight, of at least one photoinitiator which is able to initiate the polymerization of ethylenically unsaturated double bonds. Such initiators include benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2, 2-dimethylacetophenone, and 2,2-dimethoxy-2-phenylacetophenone, benzoin and benzoin ethers, such as methyl, ethyl and butyl benzoin ether, benzil ketals, such as benzil dimethyl ketal, 2-methyl-1-(4-methylthiophenyl)-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl-2,4,6-trimethylbenzoylphenylphosphinate, and bisacylphosphine oxides. Examples of such initiators are the products available commercially under the brand names Irgacure® 184 and Darocure® 1173 from Ciba Geigy, Genocure® from Rahn or Lucirin® TPO from BASF AG.

Furthermore, depending on their intended use, the coating compositions of the invention may contain up to 35% by weight of customary auxiliaries, such as thickeners, leveling assistants, defoamers, UV stabilizers, lubricants, and fillers. Suitable auxiliaries are well known to the skilled worker from the technology of paints and coatings. Suitable fillers include silicates, examples being silicates obtainable by hydrolysis of silicon tetrachloride, such as Aerosil® from Degussa, silica, talc, aluminum silicates, magnesium silicates, calcium carbonates, etc. Suitable stabilizers include typical UV absorbers, such as oxanilides, triazines, and benzotriazole (the latter obtainable as Tinuvin® grades from Ciba-Spezialitätenchemie), and benzophenones. These may be used alone or together with suitable free-radical scavengers, examples being sterically hindered amines, such as 2,2,6,6-tetramethylpiperidine, 2,6-di-tert-butylpiperidine or derivatives thereof, e.g., bis(2,2,6,6-tetramethyl-4-piperidyl) sebacate. Stabilizers are used normally in amounts of from 0.1 to 5.0% by weight and preferably from 0.5 to 3.5% by weight, based on the coating composition.

The invention additionally provides a process for producing a coated substrate, which comprises
applying a polymer dispersion of the invention or a coating composition of the invention to the surface of the substrate,
drying the applied polymer dispersion at elevated temperatures, and
curing the dried polymer dispersion by irradiation with UV or electron beams.

The coating compositions of the invention are suitable for coating a large number of substrate surfaces such as those in particular of metal, wood, plastic, paper or leather. The invention further provides the coated substrates obtainable by the coating process described above. The invention additionally provides, as well, for the use of the polymer dispersions of the invention in or as coating compositions.

The coating compositions of the invention are cured by exposure to actinic radiation, such as electron beams or UV rays. In one appropriate embodiment, curing takes place by irradiation at room temperature. In one preferred embodiment, curing takes place at temperatures in the range from 20 to 170° C., in particular from 40 to 130° C. In another preferred embodiment, radiation curing takes place under an inert gas atmosphere, e.g., under nitrogen. The coatings obtained by curing the coating compositions of the invention have good performance properties, such as pendulum hardnesses, pencil hardnesses and Erichsen cupping values, for example. This is preferably so when radiation curing takes place at elevated temperatures. Surprisingly, very good coatings are generally obtained if an aliphatic carboxylic anhydride, especially succinic anhydride, has been used to introduce ionic groups into the copolymers used in accordance with the invention.

The invention is illustrated by the following nonrestricting examples.

Experimental Method:

Viscosity:
The viscosity was determined using a rotational viscometer to DIN 53019.

Particle Size:
Particle size (PS) was determined by light scattering on an instrument from Malvern.

Solids Content:
The solids content (SC) was determined by measuring the mass loss on drying of the dispersion at 120° C. for one hour.

pH:
The pH was determined using a pH electrode to DIN 19261, ISO 787.

Glass Transition Temperature:
The glass transition temperature was determined by DSC (differential scanning calorimetry).

I. Preparation of Methacrylate Copolymers and Polymer-Analogous Reaction with Acrylic Acid Example 1

A mixture of 85% methyl methacrylate, 5% methyl acrylate and 10% glycidyl methacrylate was polymerized at 200° C. in an annular reactor. The initiator used was di-tert-amyl peroxide. The initiator concentration was 1.5% of amyl peroxide. Polymerization was followed by devolatilization of the melt at 200° C. under a pressure of approximately 40 mbar. The resulting polymer had a molecular weight Mn of 3000 g/mol. 2000 g of this epoxy resin were dissolved in 667 g of xylene in a glass apparatus, and then 0.5% of tetrabutylammonium bromide was added. 365 g of acrylic acid were added at a temperature of 130° C. The reaction mixture was then stirred until about 95% of the epoxy groups had undergone conversion. The excess acrylic acid and the solvent were removed in an extruder at a temperature of 130° C. under a reduced pressure of <100 mbar. Following the reaction, a molecular weight Mn of 3000 g/mol was measured. The Tg (glass transition temperature) was 52° C.

Example 2

A mixture of 25% styrene, 47% methyl methacrylate and 28% glycidyl methacrylate was polymerized at 190° C. in an annular reactor (initiator=1.5% di-tert-amyl peroxide). Following the polymerization, the melt was devolatilized at 190° C. under a pressure of approximately 40 mbar.

The resulting polymer had the following properties:
molecular weight: Mn=2939 g/mol
polydispersity: 2.54
Tg: 57° C.
viscosity at 120° C.: 850 Pas.

2400 g of this epoxy resin were dissolved in 800 g of xylene in a glass apparatus, and 1.5% of triphenylphosphine was added. 590 g of acrylic acid were added at a temperature of 130° C. Stirring was then continued until about 97% of the epoxy groups had undergone conversion. Following functionalization and devolatilization in an extruder, the polymer had the following properties:
molecular weight: Mn=3550 g/mol,
Tg: 44° C.

Example 3

A mixture of 23% glycidyl methacrylate, 9% n-butyl acrylate, 47% methyl methacrylate, 7% methyl acrylate and 14% styrene was polymerized at 190° C. in an annular gap reactor in the presence of 3.0% of di-tert-amyl peroxide, and then devolatilized at 190° C. under a pressure of approximately 40 mbar.

The resulting polymer had the following properties:
molecular weight: Mn=2400 g/mol
polydispersity: 2.1
Tg: 29° C.

This epoxy polymer was coarsely ground, 1.5% of tetrabutylammonium bromide was added, and the mixture was reacted with acrylic acid at 130° C. in an extruder (ZSK 30 from Werner und Pfleiderer). In a further devolatilizing extruder (ZSK 30 from Werner und Pfleiderer), the excess acrylic acid was removed at a temperature of 130° C. under a pressure<100 mbar. Following devolatilization, the polymer was filtered (40 μm candle filter).

The resulting polymer had the following properties:
conversion of the epoxy groups: 98%
molecular weight: Mn=2500 g/mol
solids content: 99%
residual acid number: about 8 mg KOH/g polymer The polymer gave a clear solution in xylene (50% strength solution).

II. Preparation of the Dispersions

Example A

| Batch: | 0.28 mol of polymer from example 1 |
|---|---|
| | 0.28 mol of succinic anhydride |
| | 31.7% of methyl ethyl ketone |
| Feed stream 1: | 24.0% of acetone |
| Feed stream 2: | 10% of hexanediol diacrylate |
| Feed stream 3: | 0.375 mol of NaOH |
| Feed stream 4: | 60% of $H_2O$ |

The batch was left to react at 80° C. for 4 hours. It was then diluted with feed stream 1, after which feed stream 2 was stirred in. It was then neutralized with feed stream 3 and dispersed with feed stream 4. Subsequently, the organic solvent was distilled off under reduced pressure.

The resulting dispersion had the following properties:

SC: 27.2% pH: 8.64

PS: 52.7 nm viscosity: 132 mPas

Example B

| Batch: | 0.399 mol of polymer from example 2 |
|---|---|
| | 0.133 mol of succinic anhydride |
| | 31.9% of methyl ethyl ketone |
| Feed stream 1: | 24.2% of acetone |
| Feed stream 2: | 15% of hexanediol diacrylate |
| Feed stream 3: | 0.133 mol of NaOH |
| Feed stream 4: | 60% of $H_2O$ |

The batch was left to react at 80° C. for 4 hours. It was then diluted with feed stream 1, after which feed stream 2 was stirred in. It was then neutralized with feed stream 3 and dispersed with feed stream 4. Subsequently, the organic solvent was distilled off under reduced pressure.

The resulting dispersion had the following properties:

SC: 25.5% pH: 7.71

PS: 185.6 nm viscosity: 323 mPas

Example C

| Batch: | 0.324 mol of polymer from example 3 |
|---|---|
| | 0.324 mol of glutaric anhydride |
| | 29.7% of methyl ethyl ketone |
| Feed stream 1: | 22.9% of acetone |
| Feed stream 2: | 15% of hexanediol diacrylate |
| Feed stream 3: | 0.324 mol of NaOH |
| Feed stream 4: | 60% of $H_{20}O$ |

The batch was left to react at 80° C. for 4 hours. It was then diluted with feed stream 1, after which feed stream 2 was stirred in. It was then neutralized with feed stream 3 and dispersed with feed stream 4. Subsequently, the organic solvent was distilled off under reduced pressure.

The resulting dispersion had the following properties:

SC: 27.7% pH: 7.02

PS: 188.9 viscosity: 37.7 mPas

III. Performance Properties

Preparation of the Coating Materials:

All parts are by weight, unless expressly stated otherwise. The coating compositions were prepared, unless expressly stated otherwise, by intensive stirring from the components indicated in the implementation examples.

Film Curing:

The coating compositions described in the implementation examples were used to produce films on clean glass plates, using a box-type coating bar with a gap size of 200 µm. The films were then dried at 80° C. for 30 minutes and, unless stated otherwise, cooled to room temperature. The films were cured on an IST coating unit with 2 UV lamps and a conveyor belt speed of 10 m/min. The radiation dose was approximately 1800 mJ/cm².

Film Testing:

Pendulum Hardness

The mechanical resistance of the coatings cured at different oxygen contents was determined by measuring the König pendulum hardness, DIN 53157, ISO 1522, following 24-hour storage in a controlled-climate chamber.

Pencil Hardness

The pencil hardness was determined on coatings which had been stored for 24 hours in a controlled-climate chamber. Pencils of different hardness were passed over the test specimens under constant pressure and at an angle of 30-45°. If, with increasingly harder pencils, a visible impression was left, the designation of the pencil was given as the hardness value (pencil hardness). The hardness scale of the pencils rose in the sequence 6B-B, HB, F, H, 2H-9H.

Erichsen Cupping

The elasticity or deformation of the films was examined on standard metal panels to DIN 53156, ISO 1520, in each case following storage of the films for 24 hours in a controlled-climate chamber.

Film data:

| Example | RT*) | 100° C.*) | 100° C. N₂*) | 150° C.*) | 150° C. N₂*) |
|---|---|---|---|---|---|
| A | PH 130 | 137 | | | |
| | EC 1.9 | 2,2 | | | |
| | BH- | H | | | |
| B | PH 154 | 188 | 185 | 179 | 203 |
| | EC 0.9 | 3.2 | 1.1 | 0.7 | 0.5 |
| | BH 3B | 2B | 2H | 2B | 2H |
| C | PH 70 | 104 | 118 | 107 | 87 |
| | EC 7.2 | 1.5 | 1.0 | 0.9 | 0.5 |

PH: pendulum hardness; EC: Erichsen cupping; BH: pencil hardness RT: room temperature
*)reaction conditions during radiation curing; 4% of Irgacure 500 (Ciba) was added as photoinitiator in each case.

We claim:

1. A polymer dispersion curable by actinic radiation that is prepared by a process, comprising:
   I) reacting a (meth)acrylate copolymer A) having a number-average molecular weight $M_n$ in the range from 1400 to 10 000 and a polydispersity ranging from 1 to 5.0, said copolymer A) carrying ethylenically unsaturated groups and functional groups capable of a condensation or addition reaction, with at least one compound B) which
      Ia) carries at least one functional group that is complementary to the functional groups of the copolymer A) that are capable of undergoing a condensation or addition reaction, and additionally at least one ionogenic, ionic group or a combination thereof, or which
      Ib) carries at least one functional group that is complementary to the functional groups of the copolymer A) that are capable of condensation or addition reaction and is capable of forming an ionogenic or ionic group in a condensation or addition reaction,
      to give a copolymer AI) which carries ethylenically unsaturated groups and ionogenic groups, ionic groups or a combination thereof,
   II) with the proviso that when ionogenic groups are present in compound B), converting at least some of the ionogenic groups of the copolymer AI) into ionic groups, and
   III) dispersing the copolymer AI) in an aqueous dispersion medium.

2. The polymer dispersion as claimed in claim 1, wherein the (meth)acrylate copolymer A) has a number-average molecular weight in the range from 1500 to 6000.

3. The polymer dispersion as claimed in claim 1, wherein in step I) compound B) is a compound that contains at least one functional group selected from the group consisting of hydroxyl groups, primary and secondary amino groups, thiol groups, carboxylic acid groups, carboxylic ester groups, carboxamide groups, sulfonic acid groups, sulfonic ester groups, isocyanate groups, urethane groups, urea groups, ether groups, and epoxy groups, and that contains at least one ionogenic or ionic group selected from the group consisting of carboxylic acid groups, sulfonic acid groups, nitrogen groups and reaction products thereof with a neutralizing or quaternizing agent.

4. The polymer dispersion as claimed in claim 1, wherein in step I) said compound B) is a carboxylic anhydride.

5. The polymer dispersion as claimed in claim 4, wherein compound B) is glutaric anhydride, succinic anhydride or mixtures thereof.

6. The polymer dispersion as claimed in claim 1, wherein the (meth)acrylate copolymer A) contains in copolymerized units of at least one monomer a1) that has a radical of the formula:

$$CH_2=C(R)-C(=O)-$$

wherein R is H or $CH_3$.

7. The polymer dispersion as claimed in claim 6 wherein monomer a1) is selected from the group consisting of esters of acrylic acid and methacrylic acid with $C_2$-$C_{30}$ alkanediols, amides of methacrylic acid with $C_2$-$C_{30}$ aminoalcohols, (meth)acrolein, (meth)acrylamide, (meth)acrylic acid, glycidyl (meth)acrylate, and mixtures thereof.

8. The polymer dispersion as claimed in claim 1, wherein the (meth)acrylate copolymer A) is prepared by:
   i) free-radically polymerizing a monomer mixture comprising
      a1) from 20 to 85 mol % of at least one monomer containing a radical of the formula:

$$CH_2=C(R)-C(=O)-$$

where R is H or $CH_3$, and
      a2) from 15 to 80 mol % of at least one free-radically polymerizable monomer other than a1),
      from 5 to 50 mol % of the monomers a1) and/or a2), based on the overall amount of the monomers a1) and a2), carrying a functional group capable of a condensation or addition reaction, to give a copolymer Ai),
   ii) reacting the copolymer Ai) with at least one ethylenically unsaturated compound C) which additionally carries at least one functional group complementary to the functional groups of the monomers a1) and/or a2) that are capable of condensation or addition reaction, to give a (meth)acrylate copolymer A).

9. The polymer dispersion as claimed in claim 8, wherein from the group of the vinyl compound C) and monomers a1) and/or a2) one of the following complementary pairs is selected whose functional groups react with one another in a condensation or addition reaction: methacryloyl isocyanate/ hydroxyalkyl methacrylate, hydroxyalkyl methacrylate/methacrylic anhydride, hydroxyalkyl methacrylate/methacryloyl chloride and glycidyl acrylate or glycidyl methacrylate/acrylic acid or methacrylic acid.

10. The polymer dispersion as claimed in claim 8, wherein the polymerization in step i) is conducted in an annular reactor.

11. A coating composition curable by actinic radiation, comprising:
　at least one polymer dispersion as claimed in claim 1,
　optionally, at least one further oligomer or polymer containing at least one ethylenically unsaturated double bond,
　optionally, at least one additive.

12. The coating composition as claimed in claim 11, comprising, as an additive, from 0.1 to 5% by weight of at least one photoinitiator which initiates the polymerization of ethylenically unsaturated double bonds.

13. A process for producing a coated substrate, which comprises:
　applying a polymer dispersion as claimed in claim 1 to the surface of a substrate,
　drying the applied polymer dispersion at elevated temperatures, and
　curing the dried polymer dispersion by irradiation with UV or electron beams.

14. The process as claimed in claim 13, wherein said substrate has a surface made of metal, wood, plastic, paper or leather.

15. The polymer dispersion as claimed in claim 1, wherein the aqueous dispersion medium is either water or a mixture of water and at least one water-soluble solvent having a water content of at least 50% by weight, based on the overall amount of the aqueous dispersion medium.

* * * * *